US010310853B2

(12) United States Patent
Wright

(10) Patent No.: US 10,310,853 B2
(45) Date of Patent: Jun. 4, 2019

(54) CODING VELOCITY

(71) Applicant: SEMMLE LIMITED, Oxford (GB)

(72) Inventor: Ian Paul Wright, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/489,441

(22) Filed: Apr. 17, 2017

(65) Prior Publication Data

US 2018/0300127 A1    Oct. 18, 2018

(51) Int. Cl.
*G06F 9/44*   (2018.01)
*G06Q 10/06*   (2012.01)
*G06F 8/77*   (2018.01)

(52) U.S. Cl.
CPC .......... *G06F 8/77* (2013.01); *G06Q 10/06398* (2013.01); *G06Q 10/0633* (2013.01)

(58) Field of Classification Search
CPC . G06F 8/77; G06Q 10/0633; G06Q 10/06398
USPC ........................................................ 717/101
See application file for complete search history.

(56) References Cited

U.S. PATENT DOCUMENTS

| | | | | |
|---|---|---|---|---|
| 7,904,875 | B2* | 3/2011 | Hegyi | G06F 8/20 |
| | | | | 717/100 |
| 9,305,279 | B1* | 4/2016 | Menzel | G06Q 10/06398 |
| 9,639,353 | B1* | 5/2017 | Henriksen | G06F 8/77 |
| 2005/0289503 | A1* | 12/2005 | Clifford | G06Q 10/06 |
| | | | | 717/101 |
| 2006/0041856 | A1* | 2/2006 | Holloway | G06F 8/20 |
| | | | | 717/101 |
| 2014/0137074 | A1* | 5/2014 | Hey | G06Q 10/063112 |
| | | | | 717/101 |
| 2015/0309790 | A1* | 10/2015 | Henriksen | G06F 17/30106 |
| | | | | 717/121 |
| 2015/0355998 | A1* | 12/2015 | Kogan-Katz | G06F 11/366 |
| | | | | 717/101 |

OTHER PUBLICATIONS

Barki et al., "Toward an Assessment of Software Development Risk", Journal of Management Information Systems, 1993, 24pg.*
Post et al., "A Stochastic Dominance Approach to Risk Analysis of Computer Systems", MIS Quarterly, vol. 10, No. 4 (Dec. 1986), pp. 363-375.*

* cited by examiner

*Primary Examiner* — Ryan D. Coyer
(74) *Attorney, Agent, or Firm* — Fish & Richardson P.C.

(57) ABSTRACT

Methods, systems, and apparatus, including computer programs encoded on computer storage media, for computing coding velocity. One of the methods includes receiving a definition of one or more individual source code developers belonging to a target developer entity. Coding-velocity samples for each individual source code developer belonging to the target developer entity are generated, wherein each coding-velocity sample represents a measure of coding activity by the individual source code developer over a respective time duration. The coding-velocity samples are aggregated according to the definition of the target developer entity. A coding-velocity model for the target developer entity is generated from the aggregated coding-velocity samples of the target developer entity. A value of a particular coding-velocity attribute for the target developer entity is computed using the coding-velocity model.

36 Claims, 11 Drawing Sheets

CODING VELOCITY

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time, and each snapshot includes a timestamp to indicate when the files were committed to the version control system.

Relationships among snapshots stored in a version control system can be represented as a directed, acyclic revision graph. Each node in the revision graph represents a commit of some portion of the source code of the code base. Each commit identifies source code of a particular snapshot as well as other pertinent information about the snapshot, such as the author of the snapshot and data about ancestors of the commit in the revision graph. A directed edge from a first node to a second node in the revision graph indicates that a commit represented by the first node occurred before a commit represented by the second node, and that no intervening commits exist in the version control system.

SUMMARY

This specification describes how a system can compute a coding velocity of a particular developer entity in a principled way from an input-output perspective. Each developer entity can be an individual developer, an arbitrarily selected group of developers, a team of developers in an organization, a group of developers who contribute code to a particular project, or some other group of developers. In some of the examples below, the distinction between an individual developer and a larger population of developers becomes important. Thus, a "developer" will refer to an individual developer, and a developer entity will refer to one or more developers.

The coding velocity analysis relates developer inputs to developer outputs, where an input is an amount of time spent by a developer, and an output is a measure of the coding activity performed during this period. The measure of coding activity Z can be any appropriate measure of actions by a developer, e.g., total lines of code added, net lines of code added, violations introduced or removed, or churn, to name just a few examples. Churn is a count of a number of lines of code added, modified, or deleted. The measure of coding activity can also be based on discrete units of work rather than on raw counts of lines added or churn. For example, a system can assign predetermined constants that represent a respective estimated standard effort, in labor time, required to make particular code changes. Thus, for larger changes the system can assign higher standard effort values, and for smaller changes the system can assign lower standard effort values.

A metric that will be referred to as coding velocity can then be defined in terms of coding activity within a particular time interval, e.g., per minute, per hour, or per day. Thus, coding velocity Y can be given by:

$$Y = \frac{Z}{X},$$

where Z is the measure of coding activity, and X is the relevant time interval. In other words, coding velocity is a measure of the rate of change to a code base per a given time interval.

To measure coding velocity, a system can collect coding-velocity samples, or for brevity, samples. Each sample can be a pair that indicates 1) a measure of coding activity and 2) the length of time over which the coding activity occurred. Alternatively, each sample can be a single value representing the quotient of the coding activity divided by the length of time. For simplicity, the examples below will assume a coding-velocity sample that is a single value representing the result of dividing a measure of coding activity by a length of time. However, the same techniques can also be used if the coding-velocity samples are actually stored as pairs or if the coding velocity is represented as the inverse, e.g., a length of time per unit of coding activity.

Coding velocity can be considered one aspect of coding productivity. In particular, the quality of the produced code, in terms of meetings its requirements in an efficient and reliable manner, is also an important aspect of productivity, which is not captured by coding velocity. However, coding velocity provides valuable insight into the activities and respective skills of developer entities in terms of the rate of their impact on codebases. The coding velocity analysis views the non-coding activities of software engineering work—such as discussing, designing, and planning—as intermediate outputs, or side-effects of producing the final output of delivered source code changes.

The job of software engineering encompasses a complex collection of activities that may occur at irregular intervals. Developers take vacations, have meetings, and ramp up on new projects. Thus, no developer entity has constant coding velocity. In order to capture such real-world complexity, the system can treat the coding velocity Y as a random variable. In particular, the system can model, for each developer entity, a range of possible coding velocities and predict the likeliness of any particular value within that range actually occurring.

As such, the system can represent the coding velocity of a developer entity as a probability distribution referred to as a coding-velocity model. For example, a coding-velocity model can assign a score that represents a likeliness that a developer's coding velocity, at an arbitrary instant of time, will be equal to a particular value x.

Importantly, the probability distribution can be influenced both by the actions of a developer entity, but also by the actions of others. In other words, the probability distribution can consider how typical developer entities behave as well as how the particular developer entity behaves. Doing so helps to account for low levels of data or noisy data.

Particular embodiments of the subject matter described in this specification can be implemented so as to realize one or more of the following advantages. Generating a coding-velocity model allows a static analysis system to rank developer entities in a principled way, even in the face of sparse and noisy data. Code base managers can use coding velocity as a way to help identify the most valuable contributors in an empirical way. The coding-velocity model provides an ability to estimate the productivity of developer entities that takes into account the fact that developers perform many tasks other than directly changing source code. The coding-velocity model can also provide the ability to estimate the productivity of developer entities that includes a measure of the uncertainty in the estimate, which helps decision makers avoid conclusions not clearly supported by the data. The coding-velocity model can also provide the ability to estimate the productivity of developer entities that avoids naive, and incorrect, methods of estimation, such as taking simple averages of activity over a time period. The coding-velocity model can also provide the ability to rank developer entities in terms of the velocity at which they change code, which tends to be robust over sparse and noisy data. And the coding-velocity model can provide the ability to estimate the absolute output of developer entities, measured in terms of the working time of a standard developer entity, over a specific time period.

Coding-velocity models provide a means to track the change in coding velocities over time, for example by constructing a time-series of velocities of developer entities measured over regular time intervals, e.g., per week, per month, etc. This information can provide software developers and senior management with valuable information about the relative intensity of the work effort at various lifecycle stages of a project, which can be used for staffing decisions in the future. These techniques provide a means to compare the activities of various projects in order to assess which projects are growing or declining. This comparison can be helpful when deciding which open-source technologies to adopt. By tracking the change in coding velocities, over a period of analysis, the intensity of work effort devoted to the project can be measured. This provides significantly more useful information than simply counting the number of active developers, or the number of commits, which fail to take into account the impact those developers or commits actually had on the codebase.

In addition, since coding velocity is measured in activity per working hour, coding velocity can be directly related to wage costs, which allows buyers of software engineering services to measure code change output per unit of monetary cost, and thereby compare the value-for-money of vendors of software engineering services in order to make better, more informed purchasing decisions.

Coding-velocity models can also be used to estimate the time required to implement a feature or a suite of features. This means that a developer or a manager no longer has to merely guess at how long it will take to implement a certain number of lines of code. Instead, the developer or manager can simply use an estimated amount of code changes with a coding-velocity model to automatically generate a value for the amount of time required to implement the required quantity of code changes.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
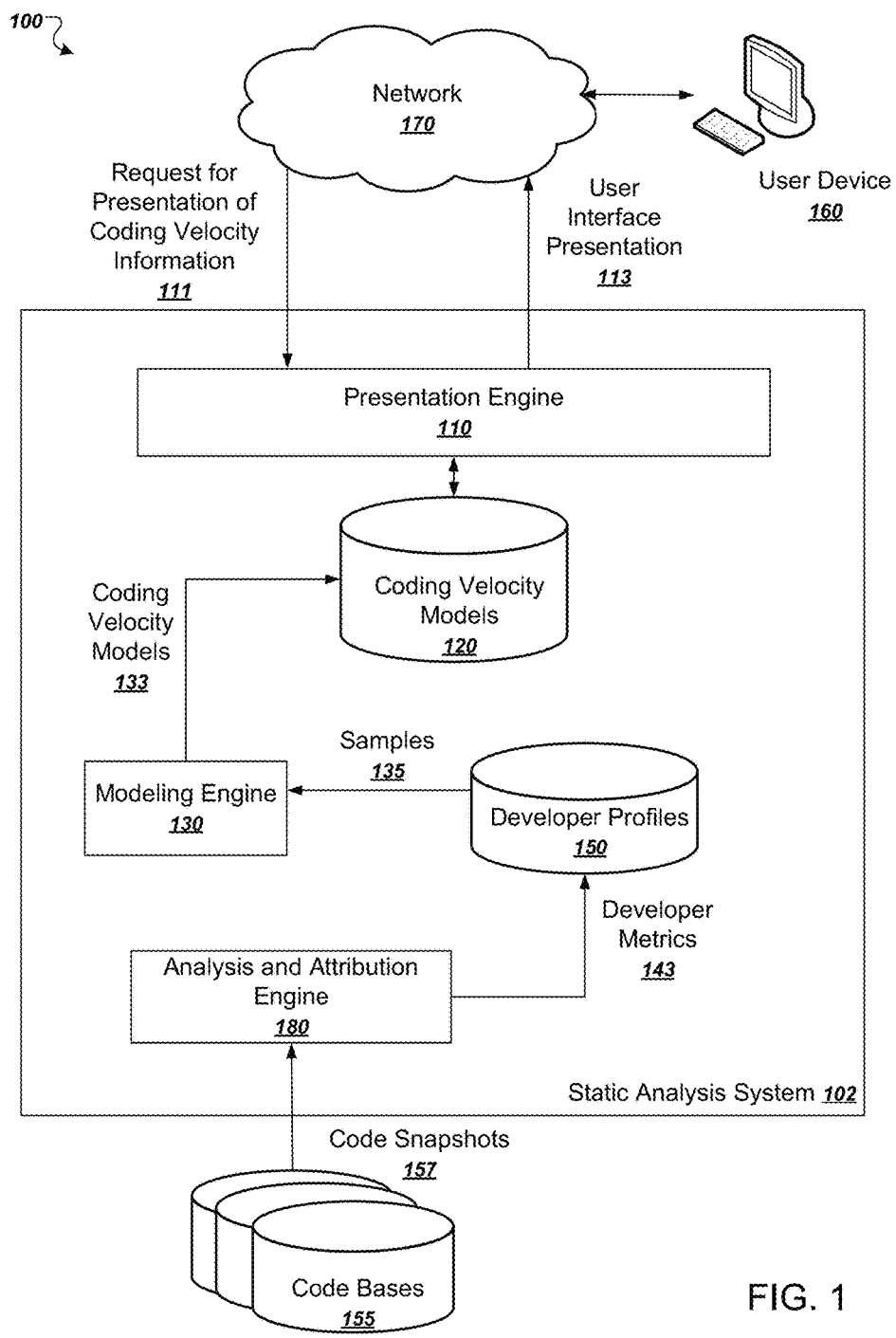
FIG. 1 is a diagram of an example system.

FIG. 1 is a diagram of an example system 100. The system 100 includes a user device 160 in communication with a static analysis system 102 over a network 170. The static analysis system 102 is an example system that can be implemented as a distributed or cloud-based system for performing distributed static analysis for a single project or across multiple projects.

The static analysis system 102 includes several components, including a presentation engine 110, a collection of coding-velocity models 120, a modeling engine 130, a collection of developer profiles 150, and an analysis and attribution engine 180. The components of the static analysis system 102 can be implemented as computer programs installed on one or more computers in one or more locations that are coupled to each through a network. In a cloud-based static analysis system, these components can each be implemented by one or more individual computing nodes of a distributed computing system.

A user of user device 160 can use the static analysis system 102 to obtain coding velocity data for developer entities who contribute source code to one or more code bases 155. Each of the code bases 155 comprises one or more snapshots. The snapshots of the one or more code bases 155 can be stored as part of the static analysis system 102 or in an external storage system.

The developer metrics 143 represent characteristics of developer actions as represented by their contributions to the one or more code bases 155. The characteristics of developer actions for each developer can be stored in the collection of developer profiles 150. The collection of developer profiles 150 associates each developer with one or more metrics corresponding to individual developer actions or relationships between developer actions for one or more of the code bases 155. For example, the metrics can include churn and lines of code added, to name just a few examples.

The developer profiles 150 may also include other developer-specific information. For example, the developer profiles 150 can include working time information that is data representing how long each developer has worked during a particular time period. The working time information can come from a variety of sources including working schedules and calendar entries. The static analysis system 102 itself would typically not have such information, nor would such information be located in the code bases 155. Thus, a user of the user device 160 can provide such information to the static analysis system 102 before or concurrently with requesting coding velocity data. Alternatively or in addition, in the absence of working time information, the system can default to a typical working schedule for developers, e.g., an eight hour day occurring five days per week.

To generate the developer metrics 143 and populate the collection of developer profiles 150, the system 102 can use an analysis and attribution engine 190. The analysis and attribution engine 180 analyzes source code in the code bases 155 and attributes changes in the source code between snapshots to particular developers. For example, the analysis and attribution engine can determine that between two snapshots of a particular code base, ten lines of code were added and that the added lines of code should be attributed to the developer that committed the later of the two snapshots. The analysis and attribution engine 180 computes the developer metrics 143 and stores this per-developer data in the collection of developer profiles 150 along with timestamps of when the snapshots were committed to the version control system.

A modeling engine 130 uses the data stored in the collection of developer profiles 150 to generate one or more coding-velocity models that capture the coding-velocity characteristics of developer entities. The modeling engine 130 receives coding-velocity samples 135 for all individual developers who contributed to the code bases 155. The modeling engine 130 also receives a specification of a principle of aggregation for how to aggregate coding-velocity samples for individual developers of a developer entity. Particular principles of aggregation for aggregating coding-velocity samples include (i) aggregating unique individual developers (to create coding-velocity models for each individual), (ii) aggregating into teams (to create coding-velocity models for teams of individuals specific in an organization), (iii) aggregating into projects (to create coding-velocity models for whole projects), (iv) aggregating into companies (to create coding-velocity models for whole companies). In some implementations, the system 102 allows end users to specify any arbitrary aggregation for defining the developer entities. Thus, an end user could specify that developers should be aggregated by geographic regions, undergraduate university, height, or hair color.

The modeling engine can then generate a coding-velocity model 133 for the developer entity, which can be stored in the collection of coding-velocity models 120. This is described in more detail below with reference to FIG. 2.

A user can submit a request for a presentation of coding-velocity information 111 to the static analysis system 102 over the network 170. The network 170 can be any appropriate data communications network, e.g., one that includes an intranet, the Internet, or some combination of these.

A presentation engine 110 receives the request 111 and uses one or more coding-velocity models in the collection of coding-velocity models 120 to satisfy the request. The request 111 itself can specify a subset of developers for which coding velocity data is to be presented.

The presentation engine 110 can use the collection of coding-velocity models 120 to compute values for a variety of different coding-velocity attributes. For example, the presentation engine 110 can obtain (i) a representative coding velocity for a given developer entity, (ii) a coding-velocity range for a given developer entity for a given credibility, e.g., 80% probability, (iii) an estimated working hours supplied by a given developer entity for a given time period, and (iv) standard coding hours produced by a given developer entity, e.g., for a given time period, and for a given reference population of developers. The standard coding hours is the result of scaling an estimated number of working hours for a developer during a particular time period by a relative coding velocity for the developer. Thus, developers who are twice as productive in terms of relative coding velocity as an average developer will have twice as many standard coding hours as the average developer over the same number of estimated working hours. The computation of standard coding hours is described in more detail below with reference to FIG. 9.

As another example, the presentation engine 110 can use the coding-velocity models to generate a coding-velocity ranking 125 for a plurality of developer entities. The presentation engine 110 can also generate other types of information, e.g., a scatter plot as described below with reference to FIG. 9.

The presentation engine 110 then generates a user interface presentation 113, which it provides back to the user device 160 over the network 170. The user interface presentation 113 can present a ranking of developers according to their individual coding-velocity models, e.g., as a hypertext markup language (HTML) or Extensible Markup Language (XML) document for display by a web browser. Some implementations include an application for the user device 160 that implements a user interface and can display, in a text or graphical form, data received from the presentation engine 110. For user devices that are smartphones, the application can be what is referred to as an "app."

Figure 2:
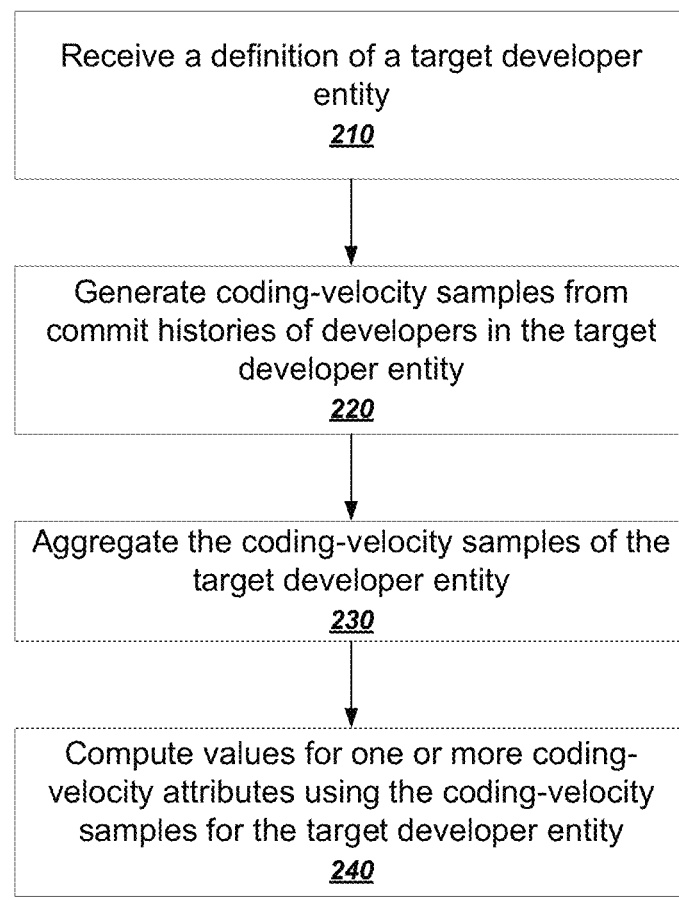
FIG. 2 is a flow chart of an example process for computing values of coding-velocity attributes from a plurality of coding-velocity samples.

FIG. 2 is a flow chart of an example process for computing values of coding-velocity attributes from a plurality of coding-velocity samples. The system can collect coding-velocity samples for a target developer entity and use one or more of a variety of techniques to compute values of coding-velocity attributes for the target developer entity. The process will be described as being performed by an appropriately programmed system of one or more computers, e.g., the static analysis system 102 of FIG. 1.

The system receives a definition of a target developer entity (210). The target developer entity is the developer entity whose coding velocity will be analyzed. As described above, the target developer entity can be a single developer or any appropriate grouping of developers to be analyzed, e.g., teams, developers on a project, and companies, to name just a few examples.

The system generates coding-velocity samples from commit histories of developers in the target developer entity (220). As described above, each coding-velocity sample is a pair that indicates a measure of coding activity and a time duration over which the coding activity occurred.

In some implementations, the system uses the changes of commits and the time intervals between adjacent commits attributed to a developer to generate the coding-velocity samples. For example, if a developer committed ten lines of code one week after his previous commit, the system can generate a coding-velocity sample that indicates 10 lines of code added over one week.

However, developers do not work 24 hours a day. Therefore, the system can refine the time duration based on an estimate of actual working hours between the commits.

To do so, the system can define a working time estimation function that maps clock time durations to working time durations. The working time estimation function can include assumptions or specific knowledge about the actual working time supplied during a particular time interval. Such assumptions can include that developers generally work 8 hours per day during 5 weekdays per week. This assumption holds good in many contexts, such as commercial work. However, any part-time developer entities will tend to have lower velocities than full-time developer entities, all other things being equal. In such cases, differences in coding velocities are not entirely attributable to differences in activity rates. In some cases, the system can use more precise knowledge of working hours, such as calendar information when available, in order to construct more accurate working time estimation functions. In this case, differences in coding velocities of part-time and full-time developers are directly comparable, and can be attributed to differences in activity rates.

Another complication is that developers tend to commit work in multiple logical chunks that are often close together in time, possibly only seconds apart. For example, a developer can submit a first commit containing an update to two files that defines an API and a corresponding implementation. A short time later, the same developer can submit a second commit that includes API calls in five different files.

Thus, in some implementations, when generating coding-velocity samples the system considers all commits by a same developer that occurred within a particular short time interval, e.g., 10 minutes, an hour, or a single day, to be the same commit corresponding to a single logical chunk of coding change. In other words, the system collapses commits by a same developer occurring during the same day into a single commit. The system can determine the length of the commit interval by analyzing typical commit intervals of the target population of developers.

Figure 3:
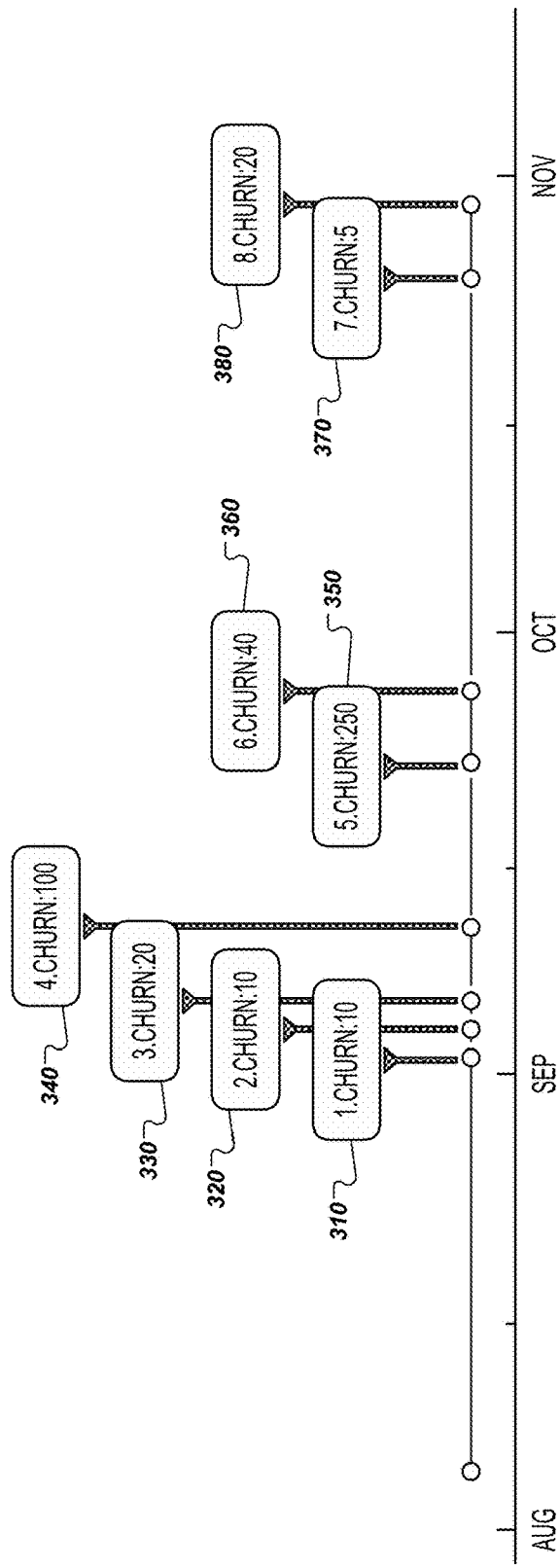
FIG. 3 is a diagram of a timeline of commits.

FIG. 3 is a diagram of a timeline of commits. Calendar-month intervals are listed along the x-axis. The timeline indicates that commits 310, 320, 330, and 340 occurred in the first half of September, commits 350 and 360 occurred in the second half of September, and commits 370 and 380 occurred in the second half of October.

From the timeline, it is difficult to get an intuitive sense for how productive the developer is. There were more commits in the first half of September (4) than in the second half (2). But in just one commit, commit 350, the developer committed more lines of code than in the previous four commits combined. This can happen, for example, if the developer postponed making commits rather than committing code on a more regular basis.

From this data, the system can generate the coding-velocity samples. For example, commit 340 indicates that on September 10th, the developer committed 100 lines of code. This was 4 days after the developer's previous commit on September 6th. Thus, the system can generate a coding-velocity sample as the pair (100, 96) or as a single value of 1.0416 to represent that 100 lines of code were committed over four days, which is 96 hours. In other words, the sample represents that the developer committed 1.0416 lines of code per hour.

However, if using the working time estimation function, the system can infer that those four days actually represented just 32 working hours. Thus, alternatively the system can generate a coding-velocity sample as the pair (100, 32) or as a single value of 3.125 to represent that 100 lines of code were committed over 32 hours. In other words, the sample represents that the developer committed 3.125 lines of code per hour.

From all the commits for a particular developer, the system can generate a coding-velocity sample vector $y_i$ according to:

$$y_i = \frac{c_i}{z_i},$$

where each $c_i$ value represents a measure of coding activity, and each $z_i$ value represents a corresponding time duration.

The system aggregates the coding-velocity samples of the target developer entity (230). Because the basis for the coding velocity data is activities by individual developers, in general, the system generates the coding-velocity samples for individual developers first, and then aggregates the samples depending on a principle of aggregation for the target developer entity. If the target developer entity is a team, the system can aggregate coding-velocity samples by members of the team. If the target developer entity is a project, the system can aggregate coding-velocity samples for commits to the project. This means that if a company has 20 developers that contribute to 2 projects, the system can first generate coding-velocity samples for the individual developers for all the projects that they work on and then aggregate the samples by classifying the samples as belonging to the target developer entity or not.

While the system may combine the values of coding-velocity samples for individual developers, e.g., for commits by a same developer that occurred on the same day, the system generally does not combine the values of coding-velocity samples for larger developer entities. The reason for this is that coding velocity is intended to quantify the skill and expertise of developer entities rather than simply their size. For example, if individual coding-velocity samples were combined in this way, a team of 100 highly unskilled developers could easily generate a higher coding velocity than a team of 5 highly skilled developers, which is a result that is not as useful for determining the skill and expertise of developers.

The system computes values for one or more coding-velocity attributes using the coding-velocity samples for the target developer entity (240). The system can compute the values for the coding-velocity attributes from the coding-velocity samples in a number of ways depending on the computational resources available and depending on how important it is to control for sampling error in the collected data. The system therefore supports trade-off decisions between the model cost, e.g., time to construct, and model accuracy, e.g., the ability to accurately predict values of coding-velocity attributes on unseen data.

For example, the system can compute values for the coding-velocity attributes relatively cheaply by simply computing statistics from the coding-velocity samples themselves. In a sense, this is a model-free approach. The representative coding velocity is then mean or median of the coding-velocity samples. The system can also compute credibility intervals from quantile ranges of the coding-velocity samples. However, this relatively cheap technique is not as accurate as other techniques.

The system can alternatively compute values for the coding-velocity attributes by fitting a pre-selected model type, e.g., a lognormal distribution, to the coding-velocity samples that maximize an objective function, e.g., maximum likelihood. This technique may be referred to as a model fitting approach. The representative coding velocity is then the mean or median of the fitted distribution, and the system can compute the credibility intervals from probability ranges of the model itself. Fitting a pre-selected model to the data introduces some bias and therefore reduces sensitivity to sampling error.

The system can introduce further bias by making use of existing knowledge regarding the typical or expected coding-velocity models expected to be encountered based on prior data analysis. In this way, the computation discounts belief in models that confound the bias, unless there is strong empirical evidence in favor of the model. For example, in using a Bayesian approach, the system can generate a posterior distribution that defines probability over the parameter space of all possible models of a pre-selected type. The system generates the posterior distribution from both the collected coding-velocity samples (the empirical evidence) and the bias computed from coding-velocity samples collected from prior data.

Bayesian velocity models are more expensive to compute but in general are more accurate. One approach is to select the coding-velocity model that corresponds to the mode of the posterior distribution, which corresponds to the maximum a posteriori model. The representative coding velocity is then the mean or median of the model, and the system can compute the credibility intervals from this model.

Alternatively, the system can construct a more accurate, but more expensive, coding-velocity model by weighting a plurality of possible models by their probabilities from the posterior distribution. By averaging over many such models, the system reduces sensitivity to sample error and incorporates all the knowledge about the uncertainty of different fits of the model type to the data. This approach may be referred to as the predictive posterior model. The representative coding velocity is then the mean or median of the model, and the system can compute the credibility intervals from this model.

Figure 4:
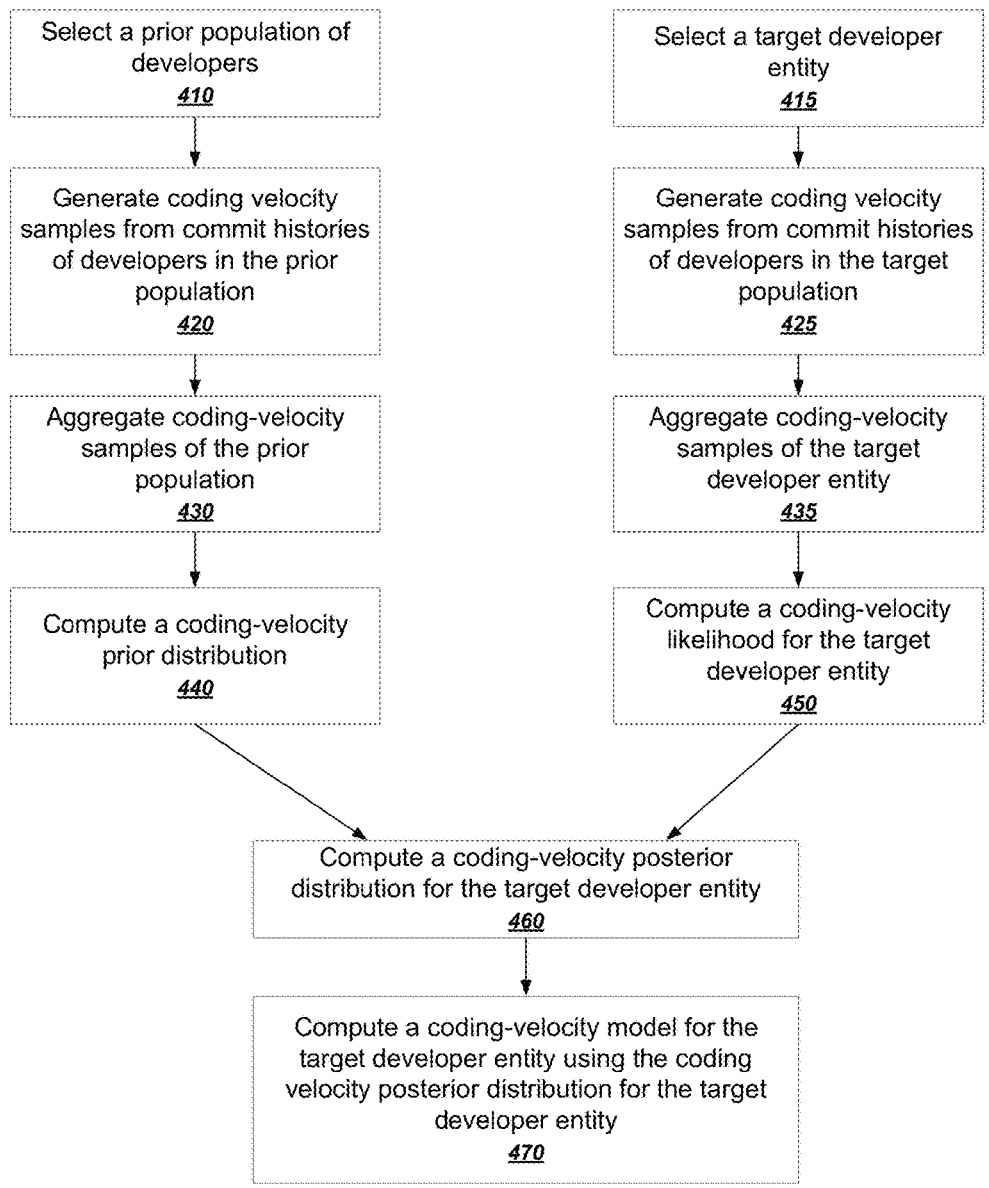
FIG. 4 is a flow chart of an example process for computing a coding-velocity model for a particular developer entity using prior coding-velocity data.

FIG. 4 is a flow chart of an example process for computing a coding-velocity model for a particular developer entity using prior coding-velocity data. The process will be described as being performed by an appropriately programmed system of one or more computers, e.g., the static analysis system 102 of FIG. 1.

The system selects a prior population of developers (410). As described above, when computing the coding velocity for a developer entity, the system can consider the behavior of the developer entity as well as considering the behavior of other developers that do not belong to the developer entity. When less data for a particular developer entity is available, the behavior of the other developers will contribute more significantly to the coding-velocity model. When more data for the particular developer entity is available, the behavior of the other developers will be less significant.

A distributed static analysis system, e.g., the static analysis system 102 of FIG. 1, may have access to source code attribution information for thousands of developers contributing source code to thousands of software projects. Thus, the system can choose any appropriate portion of the contributed source code as a prior population of developers.

The system receives a definition of a target developer entity (415). The target developer entity is the developer entity for which a coding-velocity model will be constructed in order to compute one or more coding-velocity attributes. As described above, the target developer entity can be a single developer or any appropriate grouping of developers to be analyzed, e.g., teams, developers on a project, and companies, to name just a few examples. The system generally chooses the prior population of developers to be mostly or completely distinct from developers in the target developer entity.

However, the system can still select the prior population of developers to match, as closely as possible, some attributes of developers in the target developer entity. In some implementations, the system partitions different code bases into categories. For example, developers that contribute to open source projects tend to behave differently than developers that contribute to commercial projects. Therefore, the system can use developers contributing to open source projects as the prior population if the target developer entity also contributes to open source projects. Likewise, the system can use developers contributing to commercial projects as a separate prior population if the target developer entity contributes to commercial projects.

The system generates coding-velocity samples from commit histories of developers in the prior population (420) and also generates coding-velocity samples from commit histories of developers in the target developer entity (425). As described above, each coding sample is a pair that indicates a measure of coding activity and a time duration over which the coding activity occurred.

The system aggregates the coding-velocity samples of the prior population (430). The system can use the same principle of aggregation that defines the target developer entity when aggregating coding-velocity samples for the prior population. In other words, if the target developer entity is a team, the system can aggregate the individual coding-velocity samples from the prior population according to teams as well. Likewise, if the target developer entity is developers on a project, the system can aggregate the individual coding-velocity samples from the prior population according to commits to respective projects.

Aggregating the coding-velocity samples of the prior population defines one or more prior developer entities from the prior population of developers. In other words, by aggregating the coding-velocity samples, the system can define a plurality of individuals, teams, projects, organizations, or some other defined groups of developers.

The system computes a coding-velocity prior distribution (440). The n-parameter coding-velocity prior distribution $P(a_1, \ldots, a_n)$ represents information about the distribution of coding velocities among developer entities of the prior population. In other words, the coding-velocity prior distribution indicates how likely it is that a developer entity will generate coding-velocity samples having a particular distribution.

One technique for representing this information is to choose a prior distribution type that sufficiently fits the empirical data. To simplify the computational complexity of this process, the system can prefer distribution types having smaller numbers of parameters over distribution types having larger numbers of parameters. Then, the coding-velocity prior distribution can be generated so as to represent the distribution of those parameters in the data. The coding-velocity prior distribution can then generate a likeliness for a particular set of parameters that the coding-velocity samples for a developer entity will have a distribution that is determined by the particular set of the parameters.

The system can generate a respective coding-velocity sample vector $v_i$ having coding-velocity samples for each developer entity i in the prior population. The system can then evaluate a number of different distribution types for the vectors $v_i$ to determine which distribution type provides the best fit for the coding-velocity samples, e.g., by using maximum likelihood estimation. The system can choose any appropriate distribution type for the prior distribution based on this analysis. For many data sets, coding velocity tends to follow a lognormal distribution, which is defined by two parameters: a mean $\mu$ and a standard deviation $\sigma$.

The system can then compute a prior distribution that captures the distribution of the parameters of the selected distribution type in the data. To do so, the system the system can compute for each vector $v_i$, a parameter sample $x_j$ having the representative parameters for the selected prior distribution type. If the prior distribution type is a lognormal distribution, the system can generate each parameter sample $x_i$ by computing a respective pair of parameters µ and σ.

The system can use any appropriate method for encoding the distribution of the parameters into a model. For example, the distribution of the two parameters of lognormal velocity distributions in the prior population may be approximately independent. A coding-velocity prior can therefore be constructed as a product of two random variables. For example, large data sets indicate that the coding-velocity prior is typically well characterized by a product of two logistic variates, where:

$$X \sim \text{Logistic}(\mu_1, \beta_1) \times \text{Logistic}(\mu_2, \beta_2).$$

In other words, X can be defined as a product of independent logistic variates. Each logistic variate itself has two parameters µ and β. To compute these four parameters ($\mu_1$, $\beta_1$, $\mu_2$, $\beta_2$), the system can perform a maximum likelihood estimate (MLE) lognormal fit for each coding-velocity sample vector)), for all developer entities in the prior population. This yields a vector of parameter sample pairs $\{[\mu_1, \sigma_1], [\mu_2, \sigma_2], \ldots [\mu_n, \sigma_b]\}$. The system can then perform a MLE logistic fit over parameter samples ($\mu_1, \mu_2 \ldots \mu_n$) to yield parameters ($\mu_1, \beta_1$). The system can then perform a MLE logistic fit over parameter samples ($\sigma_1, \sigma_2, \ldots \sigma_n$) to yield parameters ($\mu_2, \beta_2$).

The coding-velocity prior distribution P(µ, σ) can thus be computed as the following four-parameter distribution of parameters ($\mu_1, \beta_1, \mu_2, \beta_2$) given by:

$$P(\mu, \sigma) = \frac{e^{\frac{\beta_1(\mu_2+\sigma)+\beta_2(\mu+\mu_1)}{\beta_1\beta_2}}}{\beta_1\beta_2 \left(e^{\frac{\mu}{\beta_2}} + e^{\frac{\mu_1}{\beta_1}}\right)^2 \left(e^{\frac{\mu_2}{\beta_2}} + e^{\frac{\sigma}{\beta_2}}\right)^2},$$

or alternatively:

$$P(\mu, \sigma) = \frac{\sec^2\left(\frac{\mu-\mu_2}{2\beta_1}\right)\sec^2\left(\frac{\mu_2-\sigma}{2\beta_2}\right)}{16\beta_1\beta_2}.$$

This prior distribution generates a likeliness that a particular developer entity's coding-velocity samples can be represented by a distribution having the input parameters mean µ and standard deviation σ.

The system aggregates coding-velocity samples of the target developer entity (435). As described above, for aggregate developer entities the system first generates coding-velocity samples for individual developers. The system can then classify the individual coding-velocity samples as belonging to the target developer entity or not.

After aggregating, the system will have a coding-velocity sample vector $v_i=[y_1, y_2, \ldots, y_n]$ for each particular developer entity i.

The system defines a coding-velocity likelihood for the target developer entity (450). The coding-velocity likelihood is a score that represents how well the coding-velocity samples for a developer entity fit the selected model type with a given set of parameters. Thus, if using a lognormal model type, the coding-velocity likelihood represents the likelihood that the target developer entity's coding-velocity samples are realizations of the random variate Y~log N (µ, σ) for given values of µ and σ.

The system can compute the coding-velocity likelihood using a coding-velocity likelihood function, which can be given by, $$P(v_i \mid \mu, \sigma) = \prod_{i=1}^{n} P(y_i \mid \mu, \sigma).$$

In other words, the coding-velocity likelihood is the product of individual probabilities that each respective coding-velocity sample for the target developer entity is a good fit for the model type given a set of parameters. If the selected model type is a lognormal distribution, $P(y_i|\mu, \sigma)$ is a probability density function of a lognormal variate. For example, $P(y_i|\mu, \sigma)$ can be given by:

$$P(y_i \mid \mu, \sigma) = \frac{1}{\sqrt{2\pi}\,\sigma} \cdot \frac{1}{y_i} e^{-\frac{(\log y_i - \mu)^2}{2\sigma^2}}.$$

The system can also use any other appropriate model type for computing the likelihood, if the other datasets or further analysis suggest a different type of velocity model.

The system computes a coding-velocity posterior distribution for the target developer entity (460). The system can compute the posterior distribution for the target developer entity using the coding-velocity prior distribution and the coding-velocity likelihood. The coding-velocity posterior distribution assigns a likeliness for each different combination of model parameters given data for a prior population and the coding-velocity samples for a target developer entity.

The coding-velocity posterior distribution can be given by:

$$P(\mu, \sigma \mid v_i, Y_0) = \frac{P(v_i \mid \mu, \sigma) \cdot P(\mu, \sigma)}{\iint P(v_i \mid \mu, \sigma) \cdot P(\mu, \sigma) d\mu \cdot d\sigma}$$

where $Y_0$ refers to the prior dataset used.

The numerator term is the coding-velocity likelihood for the target developer entity multiplied by the prior distribution given a set of parameters µ and σ. The double integral in the denominator is a normalizing constant that defines the posterior distribution as a probability density function.

Figure 5A:
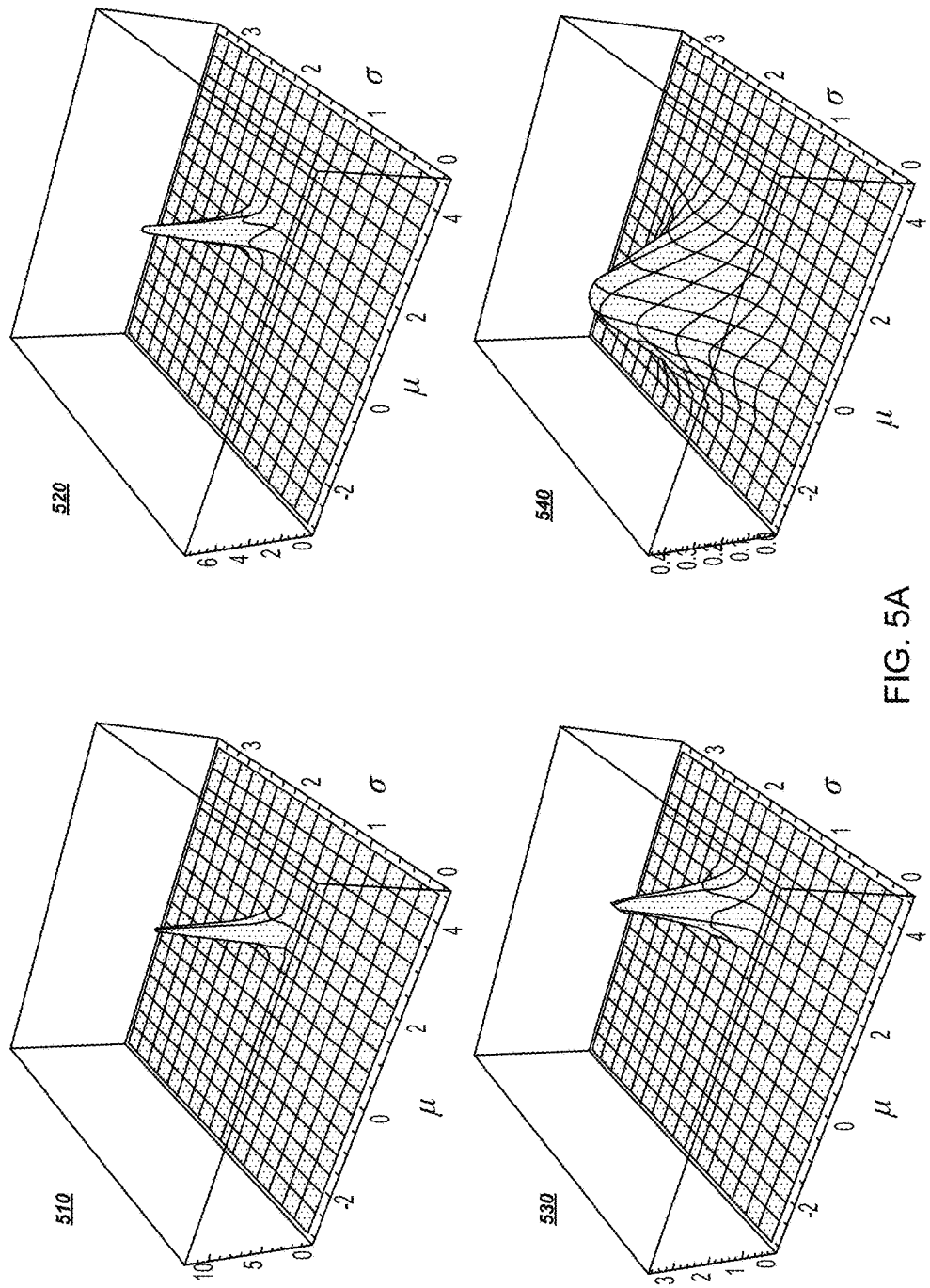
FIG. 5A illustrates example coding-velocity posterior distributions.

FIG. 5A illustrates example coding-velocity posterior distributions. Plots 510, 520, 530, and 540 represent the posterior distribution for a particular developer entity. The µ axis represents values for the mean of a lognormal model. The σ axis represents values for the variance of the lognormal model. The height of each point represents the probability density of a given lognormal model with input parameters defined by the the points on the µ axis and the σ axis. Each point on each surface thus represents the relative probability of a specific instance of a lognormal model. Thus, the plots make clear that some lognormal models are more likely explanations of the observed data.

Sharp-peaked distributions correspond to developer entities with many samples that are consistent with a lognormal model and therefore low uncertainty. For example, the distribution 510 is for a developer entity with 170 samples.

On the other hand, more dispersed distributions correspond to developer entities with fewer samples and therefore higher uncertainty. For example, the distribution 540 is for a developer entity with only 3 samples.

The system computes a coding-velocity model for the target developer entity using the coding-velocity posterior distribution of the target developer entity (470). The coding-velocity model can generate a score that represents a likeliness that the target developer entity will generate samples having a particular coding velocity.

As described above, the posterior distribution assigns a probability to every possible combination of parameters for a coding-velocity model. Thus, in order to generate a single coding-velocity model for the target developer entity, the system can collapse the posterior distribution into a composite model.

For example, the system can generate a coding-velocity model by selecting the parameters that have the highest probability according to the posterior distribution. These sets of parameters correspond to the global maxima of the plots illustrated in FIG. 4.

Alternatively, the system can compute a (possibly more computationally expensive) predictive distribution from the posterior distribution, which weights each possible model for each combination of parameters by its corresponding posterior probability according to the posterior distribution. Thus, the coding-velocity model can be interpreted as predicting a new coding-velocity sample for the target developer entity that takes into account all the uncertainty over all the specific model instances that could explain the observed data.

For example, if using the two-parameter lognormal distribution type described above, the system can generate a coding-velocity model for developer entity i that is a probability density function given by:

$$P_{Y_i}(y) = \iint P(y|\mu,\sigma) \cdot P(\mu,\sigma|v_i,Y_0) d\mu \cdot d\sigma$$

where $P(y|\mu, \sigma)$ is a probability density function of a lognormal variate given particular parameters $\mu$ and $\sigma$, and $P(\mu, \sigma|v_i, Y_0)$ is the coding-velocity posterior distribution.

After generating the coding-velocity model for the target developer entity, the system can use the model to compute values for a variety of coding-velocity attributes of the target developer entity. For example, the system can use the model to compute a probability that the target developer entity will have a particular coding velocity. As another example, the system can use the model to compute a most likely representative coding-velocity value for the target developer entity. In addition, the system can use the model to compute credibility intervals that indicate, for a particular developer entity, a minimum and a maximum velocity between which a particular percentage of coding-velocity samples will lie with a particular measure of certainty.

Developers of the system can also use coding-velocity models of target developer entities to improve project planning activities. Conventionally, developers estimate the amount of time required to develop a new feature for a project by estimating two things: (1) the amount of code required to implement the feature, and (2) a guess as to the working time required to implement the estimated amount of code.

Coding velocity provides an alternative method of producing time estimates. In this approach, a developer estimates an amount of code that the new feature will require. For example, a developer may estimate that feature X will roughly require adding 1000 new lines of code, modifying 200 existing lines and deleting 100 lines of code. Or the developer may estimate in terms of adding, deleting, and modifying source code files, and then translate these estimates into lines of code changes based on the average number of lines of code per file in the project. The lines-of-code change estimates can then be directly translated into estimates of required working time (with upper and lower credibility bounds) by using the coding-velocity model for a target developer entity. One advantage of using coding-velocity models is that developers need only to estimate the amount of coding required to implement the feature. The second step can be automatically performed based on the developer's, or the team's, actual coding velocity, derived from empirical data.

In addition, the above estimates can be aggregated to provide estimates for the total amount of working time required to produce a release of a software product with a defined number of features.

Figure 5B:
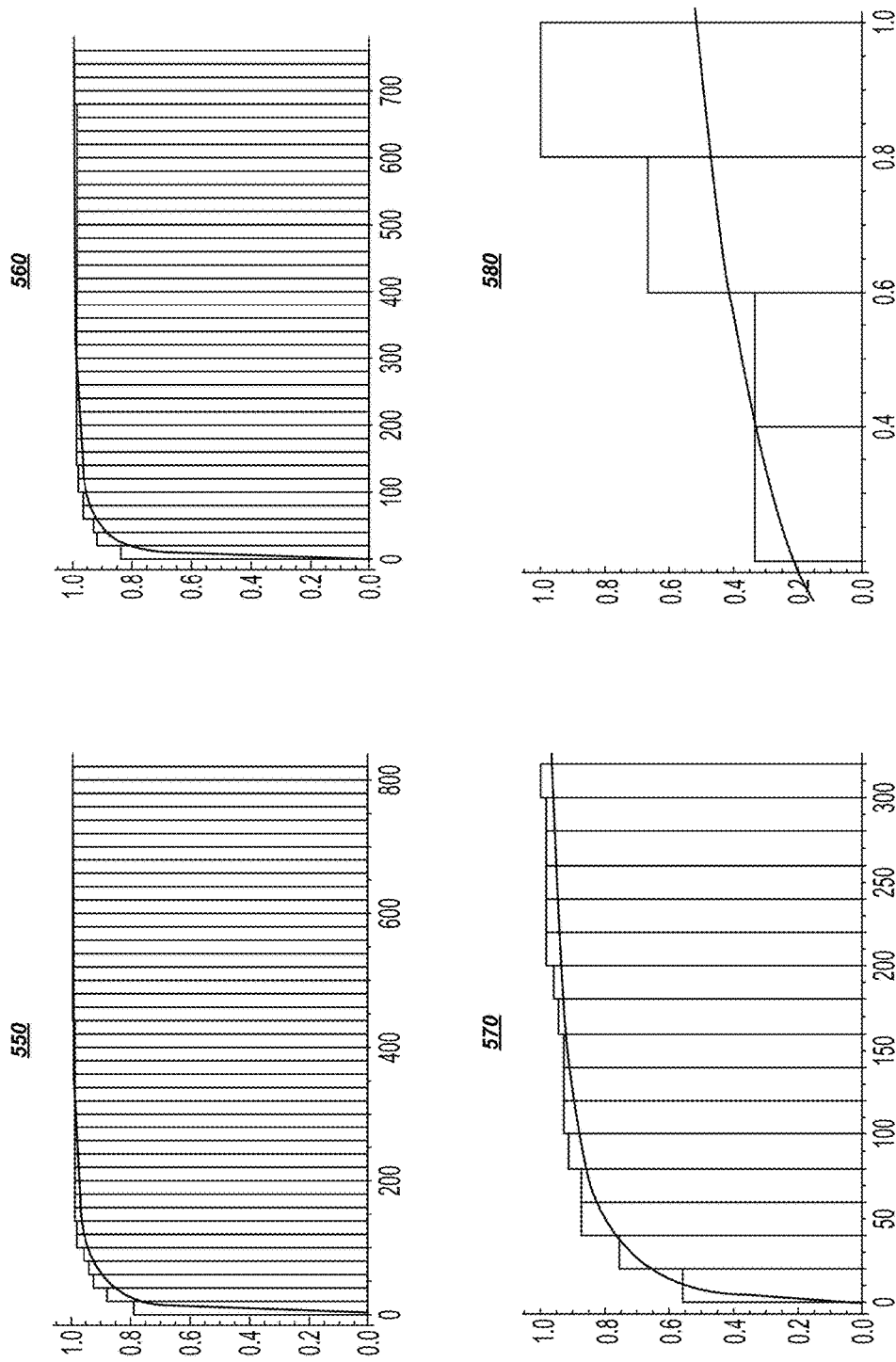
FIG. 5B illustrates coding-velocity models compared to binned coding-velocity samples.

FIG. 5B illustrates coding-velocity models compared to binned coding-velocity samples. Each of the graphs 550, 560, 570, and 580 corresponds respectively to the data used for the posterior distributions of FIG. 5A.

The vertical bars represent the cumulative distribution functions of each target developer entity's binned coding-velocity samples. The x-axis represents coding velocity, and the y-axis represents a probability. As shown from the first bar of the graph 550, nearly 80% of the target developer entity's coding-velocity samples had a velocity between 0 and 20.

The curved line is the cumulative distribution function (CDF) of the coding-productivity model. As shown, the fit is better for target developer entities having more data. But importantly, for target developer entities having less data, the model extrapolates to predict beyond the collected data.

For example, the graph 580 corresponds to a target developer entity who only had three coding-velocity samples, all of which were between 0 and 1.0. Because the coding-velocity model is influenced by the data of other developers, the curved line in the graph 580 representing the CDF of the coding-velocity model does not assign a 100% probability that all of the target developer entity's coding-velocity samples will be under 1.0. Rather, the last vertical bar representing a single sample in a single bin corresponds to only a probability of about 0.50.

These examples illustrate that the process described mixes prior coding velocity data with target developer entity coding velocity data in a principled way. This allows the system to extrapolate in cases of sparse data. In addition, these techniques also allow the system to down-weight noisy samples that arise from bad data collection processes.

Figure 6:
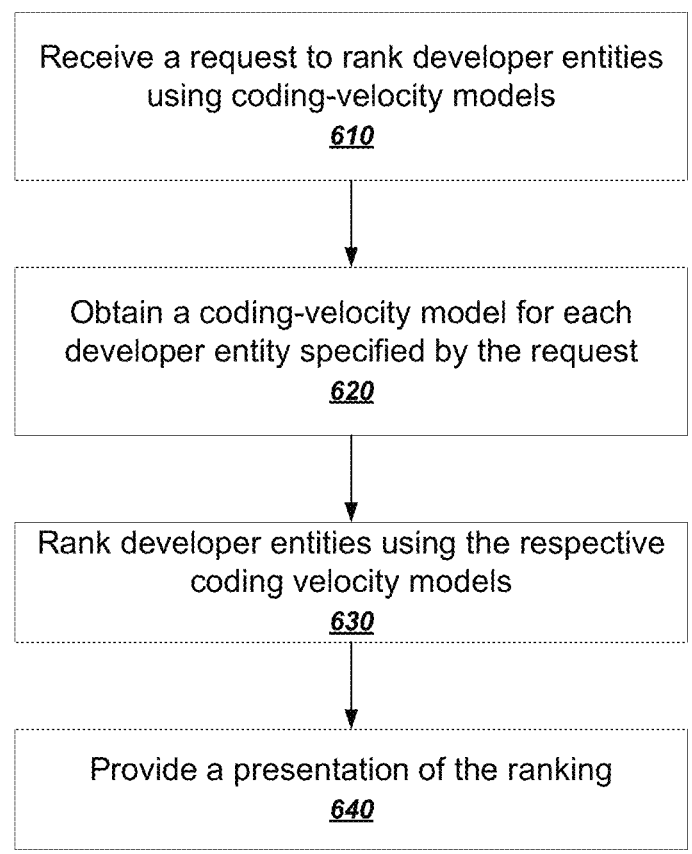
FIG. 6 is a flow chart of an example process for ranking developer entities using a coding-velocity model.

FIG. 6 is a flow chart of an example process for ranking developer entities using a coding-velocity model. The process will be described as being performed by an appropriately programmed system of one or more computers, e.g., the static analysis system 102 of FIG. 1.

The system receives a request to rank developer entities using coding-velocity models (610). For example, as described above, the request can be received by a distributed static analysis system from a user device over a network.

The request can specify a subset of developer entities who have contributed to code bases analyzed by the static analysis system and for which the system has generated coding-velocity models. For example, the request can be a request to rank developers on a particular team of developers within an organization, a request to rank multiple teams of developers, a request to rank all developers within an organization, a request to rank multiple projects, a request to rank multiple organizations, a request to rank all developers who have contributed to a code base, or a request to rank all developers who have contributed any source code to any of the code bases, to name just a few examples.

The system obtains a coding-velocity model for each developer entity specified by the request (620). For example, the system can obtain a previously computed coding-velocity model or compute one as described above with reference to FIGS. 2-5.

The system ranks the developer entities using the respective coding-velocity models (630) and provides a presentation of the ranking (640). There are a variety of ways that the system can rank developer entities using a coding-velocity model and a variety of different user interface presentations for presenting the ranking.

In general, the system can rank developer entities relative to one another by projecting data of the coding-velocity models into a one-dimensional space and ranking the developer entities according to where they fall in that one-dimensional space.

One technique for ranking developer entities using the coding-velocity model is to compute a representative coding-velocity point estimate from the coding-velocity model for the developer entity. The system can compute the coding-velocity point estimate as any appropriate representative value for the coding-velocity model. In some implementations, the system computes the coding-velocity point estimate as a value that maximizes a particular utility function. For example, the median of the coding-velocity model maximizes a linear utility function. The system can also use other representative coding-velocity point estimates using the mean or mode of the coding-velocity model. In some situations the median has advantages over the mean. In particular, the median can better represent a right-skewed distribution compared to the mean. In addition, the median minimizes a linear loss function in terms of predicting future coding-velocity samples.

To use the median for the coding-velocity point estimate, the system the system computes a value $\pi_i$ such that:

$$P(Y_i \geq \pi_i) = P(Y_i \leq \pi_i).$$

The system can then rank all developer entities specified by the request according to the coding-velocity point estimates.

Coding-velocity point estimates discard all of the distributional data of the model. Thus, to give a more complete picture within a user interface presentation, the system can also compute and present credibility intervals, which may be referred to as coding-velocity ranges. The coding-velocity range defines a range of values within which the predictions are expected to fall for a given probability. Thus, the coding-velocity range is a pair of values $[\underline{\pi}_i, \overline{\pi}_i]$ given by:

$\underline{\pi}_i$ such that $$P(0 < Y_i \leq \underline{\pi}_i) = \frac{1}{2}(1-x),$$

and $$P(\overline{\pi}_i < Y_i \leq \infty) = \frac{1}{2}(1-x),$$

$\overline{\pi}_i$ such that
where x is a value between 0 and 1 representing the desired credibility. A larger coding-velocity range implies more uncertainty, and a smaller coding-velocity range implies less uncertainty.

However, because coding-velocity is a random variable, a ranking by merely a coding-velocity point estimate can be somewhat misleading.

Thus, in some implementations, the system can compute a ranking according to stochastic dominance between the coding-velocity models.

A developer entity i's coding-velocity model stochastically dominates another developer entity j's coding-velocity model if:

$$\forall y \in [0, \infty], P(Y_i > y) \geq P(Y_j > y).$$

In other words, developer entity i ranks higher than developer entity j if developer entity i has a higher probability than developer entity j of exceeding any given coding velocity y.

Figure 7:
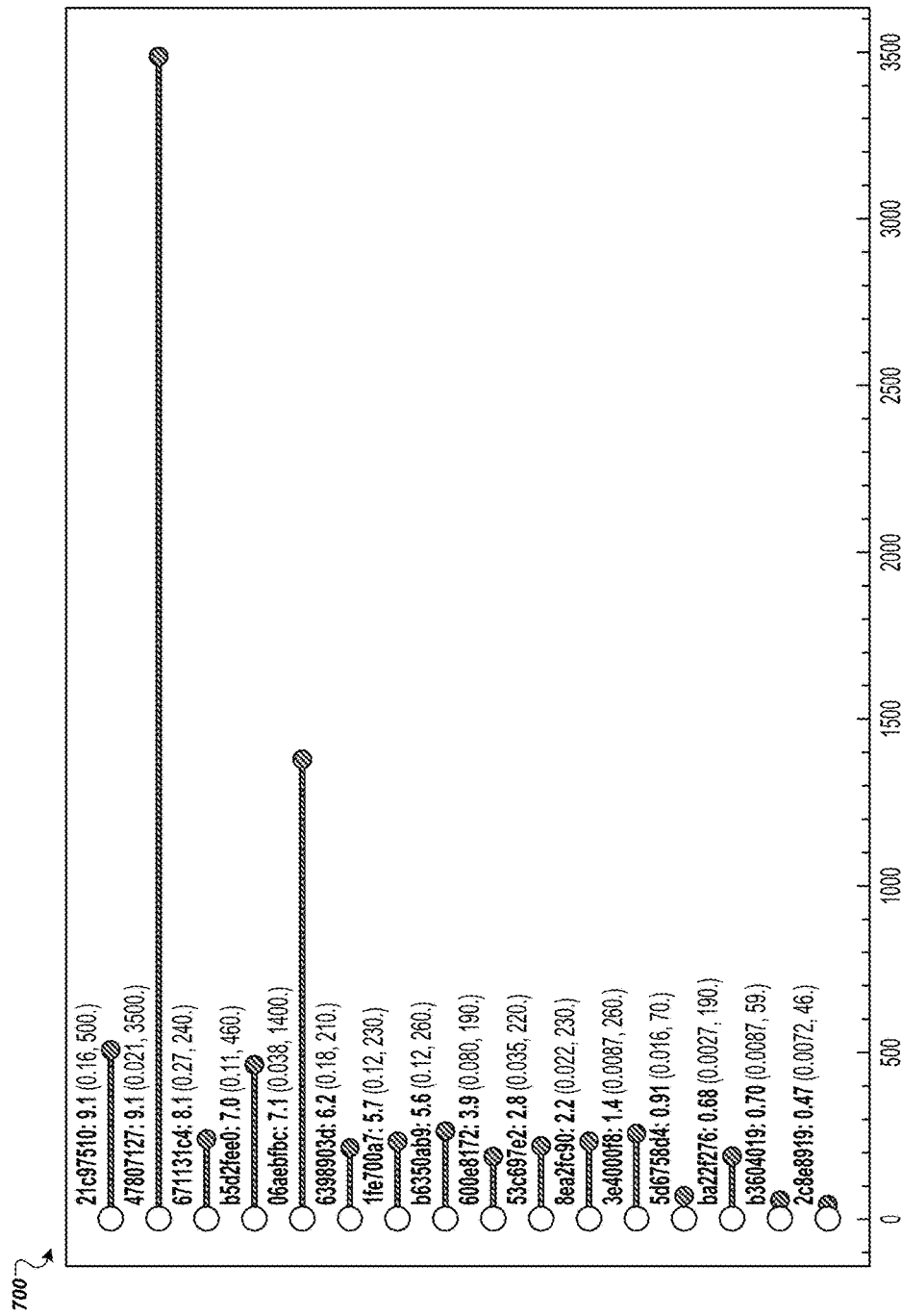
FIG. 7 illustrates an example presentation of developer entities ranked according to a stochastic dominance estimate.

FIG. 7 illustrates an example presentation 700 of developer entities ranked according to a stochastic dominance estimate. In the presentation 700, the identifiers of the individual developer entities have been obscured with hexadecimal identifiers. The ordering of developer entities from top to bottom represents the estimate of stochastic dominance between their respective coding-velocity models.

The presentation 700 also includes the coding-velocity point estimate for each developer entity in order to give an intuitive sense for the coding velocity of the developer entities. In other words, while the developer entities are ranked according to a stochastic dominance estimate, the presentation actually presents the coding-velocity point estimate.

The presentation 700 also includes a horizontal bar for each developer entity that indicates the developer entity's coding-velocity range, which is also labeled along the x-axis. From this data, it can be readily seen that the confidence in the data for the top-ranked developer entity is higher than that for the second-ranked developer entity. In some implementations, the system can also present multiple coding-velocity ranges for each developer, with each range corresponding to a different credibility interval. For example, the system can present for each developer a range corresponding to the 50%, 75%, 90%, and 95% credibility intervals, which can better show the underlying distribution. The system can also present this information for each developer entity as a probability distribution, e.g., as illustrated in FIG. 6. For example, a user may be able to select a particular developer entity in the presentation 700, and in response, the system can present the coding-velocity model for the developer entity as a probability distribution.

The presentation 700 also illustrates how the ranking by stochastic dominance estimate can differ from the coding-velocity point estimate. For example, the fourth-ranked developer entity has a coding-velocity point estimate of 7.0, which is lower than the fifth-ranked developer entity, who has a coding-velocity point estimate of 7.1. This may be because, as indicated by their respective coding-velocity ranges, that the fifth-ranked developer entity has data with lower confidence.

The system can also rank developer entities by relative coding velocity. A ranking by relative coding velocity compares a particular developer entity's coding-velocity model to that of a reference developer entity, which may be thought of as an "average" developer entity.

To define the reference developer entity, the system can compute a standard coding-velocity over a set of developer entities A according to:

$$\alpha_A = \frac{1}{|A|} \sum_{i \in A} \pi_i,$$

where $\pi_i$ is the developer entity's velocity point estimate.

The system can then compute a measure of relative coding velocity according to:

$$\pi_i^* = \frac{\pi_i}{\alpha_A},$$

where the relative coding velocity is measured in units of standard coding velocity. In other words, if the relative coding velocity is 2.0, the developer entity has a coding velocity that is twice as fast as the standard coding-velocity.

Figure 8:
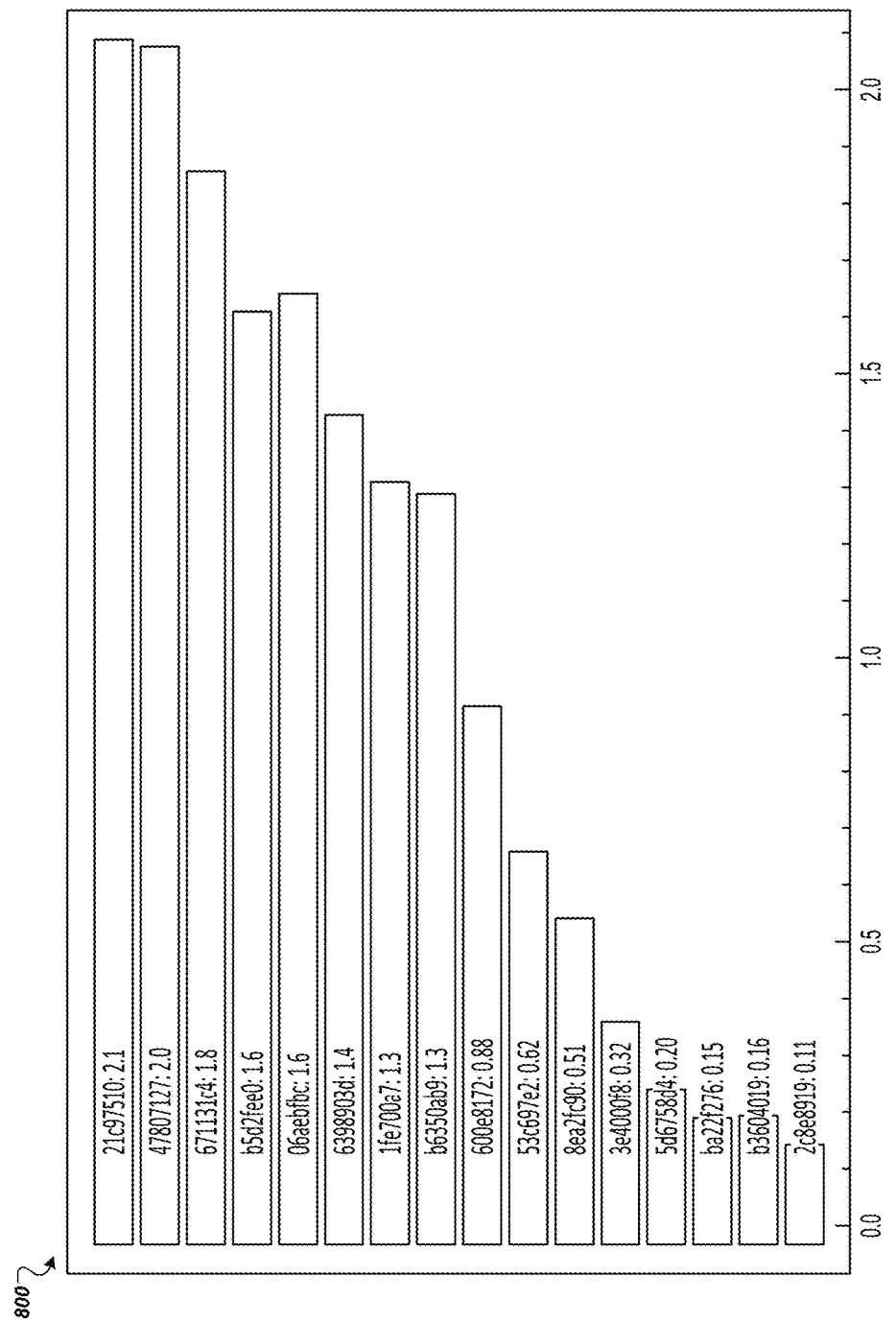
FIG. 8 illustrates an example presentation of relative coding velocity.

FIG. 8 illustrates an example presentation 800 of relative coding velocity. In the presentation 800, the identifiers of the individual developer entities have been obscured with hexadecimal identifies. The ordering of developer entities from top to bottom again represents the estimate of stochastic dominance between their respective coding-velocity models.

But the presentation 800 displays the relative coding velocity for each developer entity, rather than the coding-velocity point estimate. This information immediately illustrates which developer entities are above the standard coding velocity, e.g., >1.0, and which developer entities are below the standard coding velocity, e.g., <1.0.

The presentation 800 also includes horizontal bars that visually emphasize the relative coding velocity data. In other words, if any developer entity has a horizontal bar that does not cross the mid-section of the page, that developer entity is below the standard coding velocity.

Figure 9:
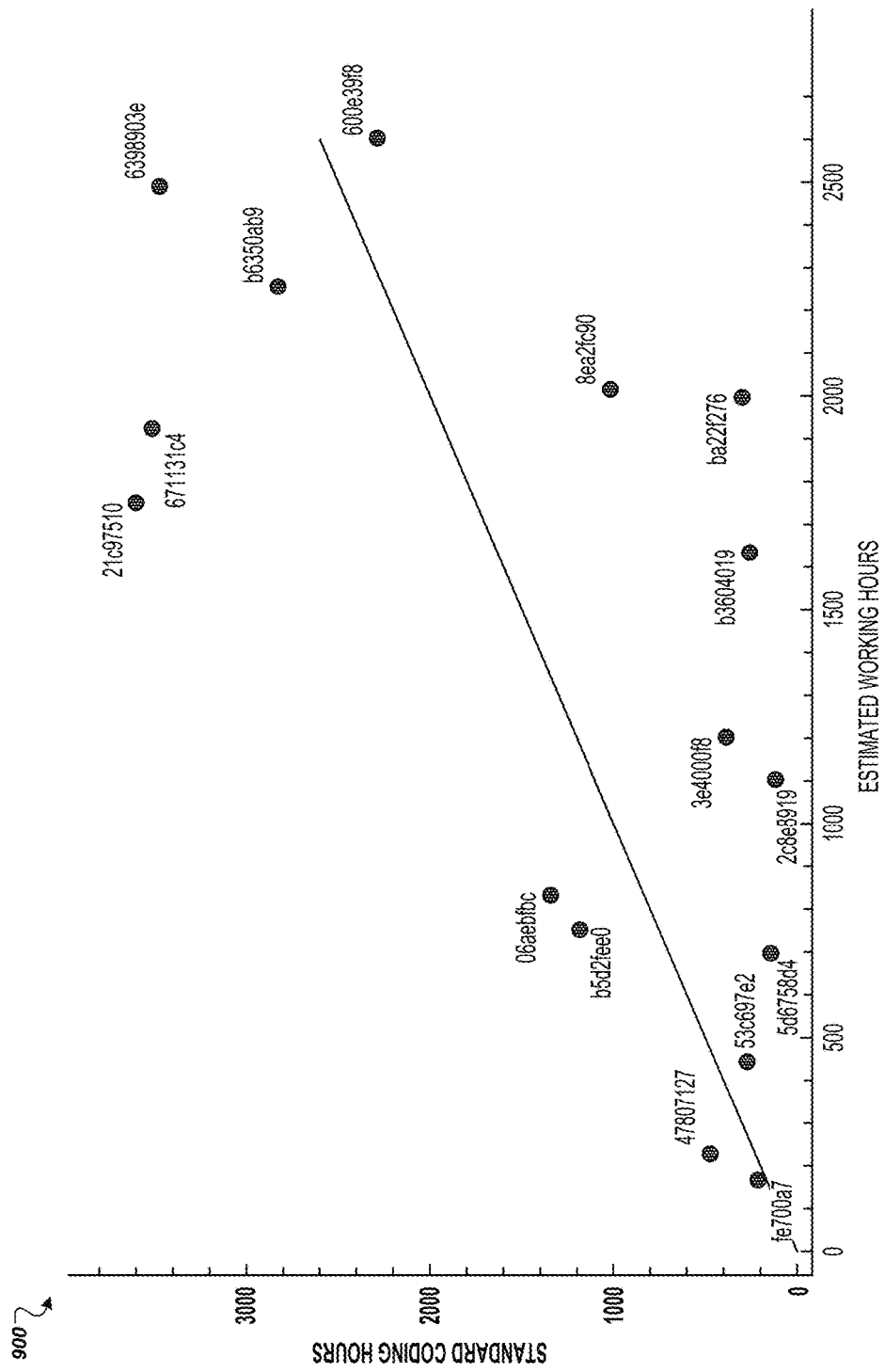
FIG. 9 illustrates an example scatter-plot presentation.

FIG. 9 illustrates an example scatter-plot presentation 900. Rather than ranking the developer entities in one dimension, the system can plot developer entities according to standard coding hours and estimated working hours.

Although coding velocity is a valuable metric, coding velocity alone cannot measure the significance of any one developer entity. For example, the contributions of a developer entity with high coding velocity may nevertheless be minor if the developer entity only worked on the code base for 1 week.

Meanwhile, a developer entity A having a coding velocity that is twice the standard coding velocity produces twice as much code per hour than what the standard developer entity would produce. Therefore, every 1 hour of A's working time is equivalent to 2 hours of a standard developer entity. The system can thus compute an absolute measure of a developer entity's output in terms of the output of a standard developer entity.

To do so, the system first computes a total estimated working hours for each developer entity, given by:

$$\xi_i = \sum_j^n x_j,$$

wherein each $x_j$ is an estimated number of working hours from a coding-velocity sample from the developer entity.

The system can then compute a standard coding hours $\sigma_i$ for each developer entity, given by:

$$\sigma_i = \pi_i^* \xi_i,$$

where $\pi_i$ is the relative coding velocity computed for the developer entity.

The system can then plot estimated working hours versus standard coding hours for each of a plurality of developer entities.

Being nearer to the top of the plot represents developer entities who have contributed the most in terms of absolute output. Being nearer to the right of the plot represents developer entities who spent the most time on the project.

The line represents the productivity of the standard developer entity. Therefore, being above the line means that a developer entity has better coding velocity than the standard developer entity, and being below the line means that a developer entity has slower coding velocity than the standard developer entity.

From the presentation 900, it is immediately apparent that the two top-ranked developer entities 21c97510 and 47807127 supplied very different working hours. And it is also clear that the developer entity 21c97510 produced significantly more output.

On the other end of the spectrum, the developer entity ba22f276 spent about 2000 hours on the project, yet produced less code than 47807126, who spent less than 300 hours on the project.

Figure 10:
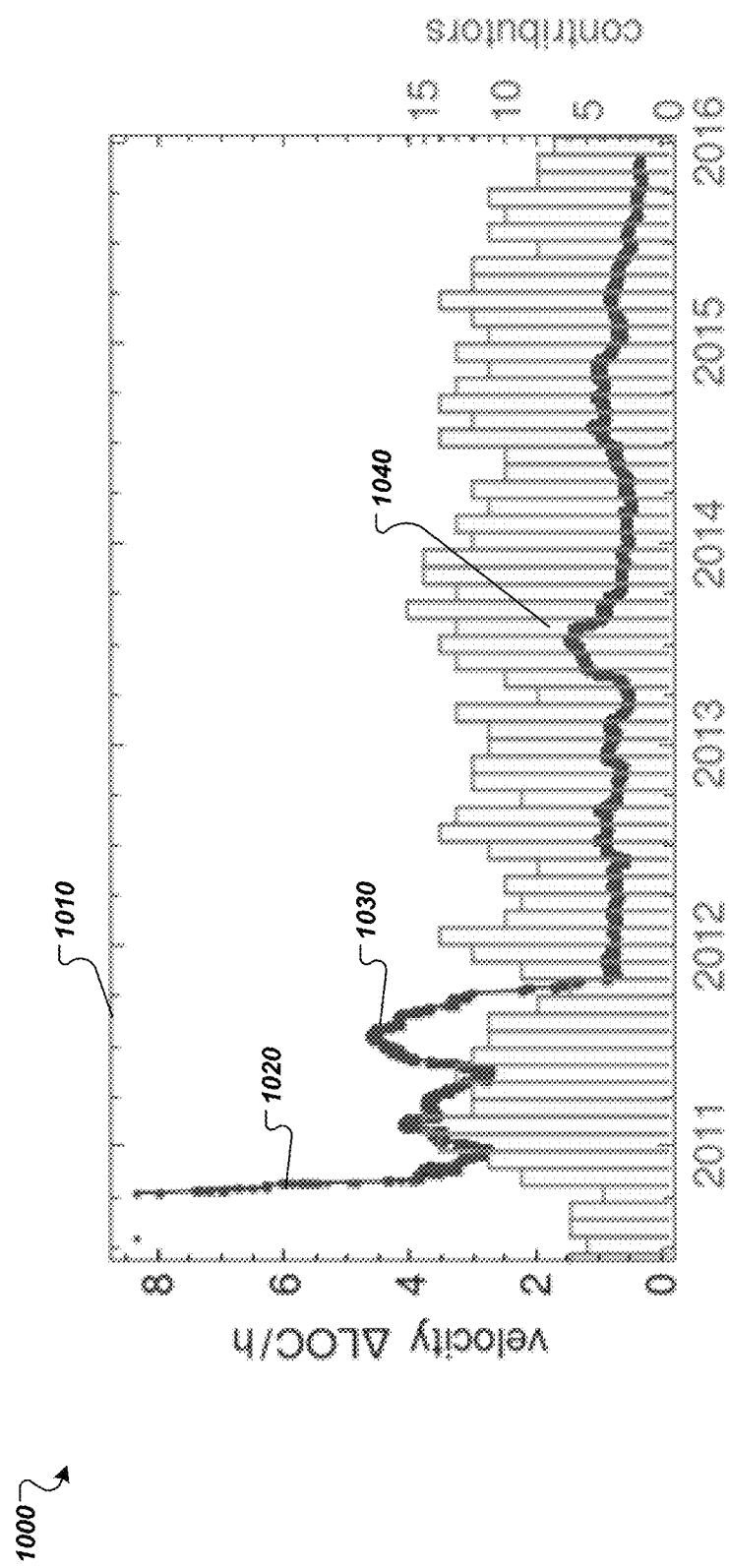
FIG. 10 illustrates an example time-series presentation.
Like reference numbers and designations in the various drawings indicate like elements.

FIG. 10 illustrates an example time-series presentation 1000. The presentation 1000 includes a plot 1010 that shows the relationship between (i) coding velocity over time for a particular developer entity and (ii) the number of developers within the developer entity. In this example, the developer entity is a team of developers who are assigned to a particular project.

The trend line 1020 illustrates how the coding velocity for the developer entity has changed over time. The x-axis is time and the y-axis for the trend line is a representative coding velocity for the developer entity. In this example, the y-axis is expressed in terms of number of lines of code changed per hour. The bars of the plot 1010, and their corresponding y-axis, represent a number of developers in the developer entity over time.

To compute this data, the system can define the principle of aggregation for the target developer entity to be all developers assigned to the particular project. The system can then compute, for each of multiple time intervals, a respective coding-velocity model for the developer entity using only developers who are assigned to the project during that time period using the techniques described above. The system can then compute, for each of the multiple time intervals, a representative coding velocity for the developer entity using any of the appropriate techniques described above or another technique.

This information is far more informative for gauging the intensity of work effort devoted to the project than other metrics, e.g., simply counting the number of developers on the project or the number of commits. These other metrics fail to take into account the actual impact that the developers on the project had during each of the time periods.

From the plot 1010, it is immediately apparent when the most coding activity occurred. The trend line 1020 shows a fairly typical lifecycle of a new product or feature. In the beginning when the project is started, the trend line 1020 reveals very intense coding activity. This activity then falls off as the project stabilizes. A large uptick 1030 in coding velocity occurs a while later, which may correspond to developers adding a new feature. The coding velocity then drops off considerably as the project stabilizes around the year 2012.

It can be seen from the plot 1010 that the drop-off around the year 2012 is correlated with a corresponding drop-off in the number of developers assigned to the project, as indicated by the bars in the plot 1010. This drop-off may indicate that there was a fairly significant restaffing effort at that time because the project was stabilizing.

A smaller uptick 1040 occurs later on, which may represent a smaller feature being added or a refactoring effort. It can also be seen from the plot 1010 that the smaller uptick 1040 is also correlated with a corresponding increase in the number of developers assigned to the project, as indicated by the bars in the plot 1010. This can reveal that more developers were brought on to the project for the new feature or for the refactoring effort. Note, however, that velocity over time measures changes in the intensity of work, in terms of impact on the codebase. So the velocity of a team of developers may vary independently of the number of developers in the team. For example, a team of 10 developers may exhibit a drop in velocity due to switching from trailblazing new features to maintaining existing features.

Software developers and senior management can use such information to gain valuable insights into the history of the work effort in a project over time. They can use such information to understand how the staffing levels over time affected the intensity of the work at various lifecycle stages of the project, and such insights can be used to plan staffing levels for future work.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments and the embodiments described above, the following embodiments are also innovative:

Embodiment 1 is a method comprising:
receiving a definition of one or more individual source code developers belonging to a target developer entity;
generating coding-velocity samples for each individual source code developer belonging to the target developer entity, wherein each coding-velocity sample represents a measure of coding activity by the individual source code developer over a respective time duration;
aggregating the coding-velocity samples according to the definition of the target developer entity;
generating a coding-velocity model for the target developer entity from the aggregated coding-velocity samples of the target developer entity, wherein the coding-velocity model assigns a likeliness to values of one or more coding-velocity attributes for the target developer entity; and
computing a value of a particular coding-velocity attribute for the target developer entity using the coding-velocity model.

Embodiment 2 is the method of embodiment 1, wherein computing the value of the particular coding-velocity attribute for the target developer entity using the coding-velocity model comprises computing: (i) a representative coding velocity for the target developer entity, (ii) a coding-velocity range for the target developer entity, (iii) estimated working hours supplied by the target developer entity for a particular time period, or (iv) standard coding hours provided by the target developer entity.

Embodiment 3 is the method of any one of embodiments 1-2, wherein aggregating coding-velocity samples for the target developer entity comprises determining whether coding-velocity samples generated for individual source code developers belong to the target developer entity.

Embodiment 4 is the method of any one of embodiments 1-3, further comprising:
generating coding-velocity samples for individual developers of a prior population of developers;
aggregating the coding-velocity samples for the prior population of developers according to a same principle of aggregation defined by the target developer entity;
generating, from the aggregated coding-velocity samples for the prior population of developers, a prior distribution that assigns a likeliness to each combination of model parameters for a particular model type;
generating a coding-velocity posterior distribution for the target developer entity, wherein the coding-velocity posterior distribution assigns a likeliness for each combination of model parameters according to the aggregated coding-velocity samples for the prior population of developers and the aggregated coding-velocity samples for the target developer entity; and
generating the coding-velocity model for the target developer entity using the coding-velocity posterior distribution.

Embodiment 5 is the method of embodiment 4, wherein generating the coding-velocity model for the target developer entity comprises weighting a plurality of possible models according to the coding-velocity posterior distribution by a likeliness of each possible model according to the posterior distribution.

Embodiment 6 is the method of embodiment 4, wherein generating the coding-velocity model for the target developer entity comprises selecting a single representative set of model parameters from the posterior distribution.

Embodiment 7 is the method of embodiment 4, further comprising selecting the prior population of developers including selecting developers who contributed to projects having one or more matching characteristics of a project for the target developer entity.

Embodiment 8 is the method of embodiment 4, further comprising selecting developers for the prior population of developers from a plurality of different code bases.

Embodiment 9 is the method of any one of embodiments 1-8, wherein generating coding-velocity samples for individual developers of the target developer entity comprises collapsing, into a single commit, multiple commits by a same individual developer occurring within a particular time interval.

Embodiment 10 is the method of any one of embodiments 1-9, wherein coding velocity is measured in terms of total or net lines of code added, churn, or estimated standard effort per each unit of time.

Embodiment 11 is the method of any one of embodiments 1-10, further comprising:

computing, for each developer entity of a plurality of developer entities including the target developer entity, a score using a respective coding-velocity model for the developer entity.

Embodiment 12 is the method of embodiment 11, wherein computing the score using the respective coding-velocity model for the developer entity comprises computing a coding-velocity point estimate.

Embodiment 13 is the method of embodiment 12, wherein the coding-velocity point estimate is the mean, median, or mode of the coding-velocity model.

Embodiment 14 is the method of embodiment 12, further comprising:
ranking the target developer entity relative to one or more other developer entities of the plurality of developer entities based on the coding-velocity point estimate for each developer entity.

Embodiment 15 is the method of embodiment 14, wherein ranking each developer of the plurality of developers based on the coding-velocity point estimate for each developer comprises ranking each developer of the plurality of developers according to a measure of stochastic dominance of the respective coding-velocity models for the plurality of developers.

Embodiment 16 is the method of embodiment 15, further comprising computing the measure of stochastic dominance as an approximation of stochastic dominance indicated by sampling the coding-velocity models of each of the plurality of developers.

Embodiment 17 is the method of embodiment 14, wherein ranking each developer of the plurality of developers based on the coding-velocity point estimate for each developer comprises computing a relative coding velocity for each developer of the plurality of developers, the relative coding velocity being a measure of the coding-velocity point estimate to that of a standard developer.

Embodiment 18 is the method of embodiment 17, further comprising generating a user interface presentation having a scatter plot that plots total estimated working hours versus standard coding hours, wherein the standard coding hours is based on the coding-velocity point estimate and the estimated working hours for each developer.

Embodiment 19 is the method of any one of embodiments 1-18, further comprising generating a user interface presentation that presents a respective score for each of one or more developer entities or a ranking of a plurality of developer entities.

Embodiment 20 is the method of embodiment 19, wherein the user interface presentation includes, for each developer entity, one or more coding-velocity ranges that indicate ranges of coding velocity within a particular credibility interval.

Embodiment 21 is the method of any one of embodiments 1-20, further comprising generating a user interface presentation that presents a probability distribution for the coding-velocity model of the target developer entity.

Embodiment 22 is the method of any one of embodiments 1-21, further comprising:
computing respective representative coding velocities for the target developer entity for each of multiple time periods; and
generating a user interface presentation that plots the change of representative coding velocity over time for the target developer entity.

Embodiment 23 is the method of embodiment 22, further comprising generating, within the user interface presentation, an illustration of the number of individual developers within the target developer entity over time.

Embodiment 24 is the method of any one of embodiment 1-23, further comprising:
receiving a request to compute an estimated number of hours required to implement a particular feature requiring a particular amount of code changes; and
using the coding-velocity model to compute the estimated number of hours required to implement the particular feature.

Embodiment 25 is a system comprising: one or more computers and one or more storage devices storing instructions that are operable, when executed by the one or more computers, to cause the one or more computers to perform the method of any one of embodiments 1 to 24.

Embodiment 26 is a computer storage medium encoded with a computer program, the program comprising instructions that are operable, when executed by data processing apparatus, to cause the data processing apparatus to perform the method of any one of embodiments 1 to 24.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:
1. A computer-implemented method comprising:
receiving a definition of a target developer entity, the definition specifying (i) one or more individual source code developers in a population of source code developers and (ii) one or more code bases to which one or more of the one or more individual source code developers have committed source code;

obtaining data representing source code contributions attributed to individual source code developers belonging to the target developer entity, the source code contributions occurring in respective commits by the individual source code developer to the one or more code bases;

obtaining data representing source code contributions attributed to individual source code developers belonging to the population of source code developers;

generating respective coding-velocity samples for each individual source code developer belonging to the target developer entity and for each individual source code developer belonging to the population of source code developers, including computing, for each commit of one or more commits by the individual source code developer to the one or more code bases:
  (i) a measure of coding activity for one or more source code contributions in the commit, and
  (ii) a time duration between (a) the commit to the one or more code bases by the individual source code developer and (b) a previous commit to any code base by the individual source code developer;

aggregating the coding-velocity samples generated for individual source code developers belonging to the target developer entity according to the definition of the target developer entity including determining which coding-velocity samples generated for each individual source code developer were generated from commits to the one or more code bases specified by the definition of the target developer entity;

aggregating the coding-velocity samples generated for individual source code developers belonging to the population of source code developers according to a same principle of aggregation as the definition of the target developer entity to generate one or more prior developer entities;

generating a coding-velocity model for the target developer entity from the aggregated coding-velocity samples of the target developer entity and the aggregated coding-velocity samples of the one or more prior developer entities, including:
  generating, from the aggregated coding-velocity samples for the one or more prior developer entities, a prior distribution that assigns a likeliness to each combination of model parameters for a particular model type,
  generating a coding-velocity posterior distribution for the target developer entity, wherein the coding-velocity posterior distribution assigns a likeliness for each combination of model parameters according to the aggregated coding-velocity samples for the one or more prior developer entities and the aggregated coding-velocity samples for the target developer entity,
  generating the coding-velocity model from the aggregated coding-velocity samples of the target developer entity and the coding-velocity posterior distribution, wherein the coding-velocity model assigns a likeliness to values of one or more coding-velocity attributes for the target developer entity; and
computing a value of a particular coding-velocity attribute for the target developer entity using the coding-velocity model.

2. The method of claim 1, wherein computing the value of the particular coding-velocity attribute for the target developer entity using the coding-velocity model comprises computing: (i) a representative coding velocity for the target developer entity, (ii) a coding-velocity range for the target developer entity, (iii) estimated working hours supplied by the target developer entity for a particular time period, or (iv) standard coding hours provided by the target developer entity.

3. The method of claim 1, wherein generating the coding-velocity model for the target developer entity comprises selecting a single representative set of model parameters from the coding-velocity posterior distribution.

4. The method of claim 1, wherein generating the coding-velocity model for the target developer entity comprises weighting a plurality of possible models according to the coding-velocity posterior distribution by a likeliness of each possible model according to the coding-velocity posterior distribution.

5. The method of claim 1, further comprising selecting the population of developers including selecting developers who contributed to projects having one or more matching characteristics of a project for the target developer entity.

6. The method of claim 1, further comprising selecting developers for the population of developers from a plurality of different code bases.

7. The method of claim 1, wherein generating coding-velocity samples for individual source code developers of the target developer entity comprises collapsing, into a single commit, multiple commits by a same individual source code developer occurring within a particular time interval.

8. The method of claim 1, wherein coding velocity is measured in terms of total or net lines of code added, churn, or estimated standard effort per each unit of time.

9. The method of claim 1, further comprising:
  computing, for each developer entity of a plurality of developer entities including the target developer entity, a score using a respective coding-velocity model for the developer entity.

10. The method of claim 9, wherein computing the score using the respective coding-velocity model for the developer entity comprises computing a coding-velocity point estimate.

11. The method of claim 10, wherein the coding-velocity point estimate is a mean, median, or mode of the coding-velocity model.

12. The method of claim 10, further comprising:
  ranking the target developer entity relative to one or more other developer entities of the plurality of developer entities based on the coding-velocity point estimate for each developer entity.

13. The method of claim 12, wherein ranking the target developer entity relative to one or more other developer entities of the plurality of developer entities based on the coding-velocity point estimate for each developer entity comprises ranking each developer entity of the plurality of developer entities according to a measure of stochastic dominance of the respective coding-velocity models for the plurality of developer entities.

14. The method of claim 13, further comprising computing the measure of stochastic dominance as an approximation of stochastic dominance indicated by sampling the coding-velocity models of each of the plurality of developer entities.

15. The method of claim 12, wherein ranking the target developer entity relative to one or more other developer entities of the plurality of developer entities based on the coding-velocity point estimate for each developer entity comprises computing a relative coding velocity for each developer entity of the plurality of developer entities, the relative coding velocity being a measure of the coding-velocity point estimate compared to that of a standard developer.

16. The method of claim 15, further comprising generating a user interface presentation having a scatter plot that plots total estimated working hours versus standard coding hours, wherein the standard coding hours is based on the coding-velocity point estimate and the estimated working hours for each developer entity.

17. The method of claim 1, further comprising generating a user interface presentation that presents a respective score for each of one or more developer entities or a ranking of a plurality of developer entities.

18. The method of claim 17, wherein the user interface presentation includes, for each developer entity, one or more coding-velocity ranges that indicate ranges of coding velocity within a particular credibility interval.

19. The method of claim 1, further comprising generating a user interface presentation that presents a probability distribution for the coding-velocity model of the target developer entity.

20. The method of claim 1, further comprising:
computing respective representative coding velocities for the target developer entity for each of multiple time periods; and
generating a user interface presentation that plots a change of representative coding velocity over time for the target developer entity.

21. The method of claim 20, further comprising generating, within the user interface presentation, an illustration of a number of individual source code developers within the target developer entity over time.

22. The method of claim 1, further comprising:
receiving a request to compute an estimated number of hours required to implement a particular feature requiring a particular amount of code changes; and
using the coding-velocity model to compute the estimated number of hours required to implement the particular feature.

23. A system comprising:
one or more computers and one or more storage devices storing instructions that are operable, when executed by the one or more computers, to cause the one or more computers to perform operations comprising:
receiving a definition of a target developer entity, the definition specifying (i) one or more individual source code developers in a population of source code developers and (ii) one or more code bases to which one or more of the one or more individual source code developers have committed source code;
obtaining data representing source code contributions attributed to individual source code developers belonging to the target developer entity, the source code contributions occurring in respective commits by the individual source code developer to the one or more code bases;
obtaining data representing source code contributions attributed to individual source code developers belonging to the population of source code developers;
generating respective coding-velocity samples for each individual source code developer belonging to the target developer entity and for each individual source code developer belonging to the population of source code developers, including computing, for each commit of one or more commits by the individual source code developer to the one or more code bases:
(i) a measure of coding activity for one or more source code contributions in the commit, and
(ii) a time duration between (a) the commit to the one or more code bases by the individual source code developer and (b) a previous commit to any code base by the individual source code developer;
aggregating the coding-velocity samples generated for individual source code developers belonging to the target developer entity according to the definition of the target developer entity including determining which coding-velocity samples generated for each individual source code developer were generated from commits to the one or more code bases specified by the definition of the target developer entity;
aggregating the coding-velocity samples generated for individual source code developers belonging to the population of source code developers according to a same principle of aggregation as the definition of the target developer entity to generate one or more prior developer entities;
generating a coding-velocity model for the target developer entity from the aggregated coding-velocity samples of the target developer entity and the aggregated coding-velocity samples of the one or more prior developer entities, including:
generating, from the aggregated coding-velocity samples for the one or more prior developer entities, a prior distribution that assigns a likeliness to each combination of model parameters for a particular model type,
generating a coding-velocity posterior distribution for the target developer entity, wherein the coding-velocity posterior distribution assigns a likeliness for each combination of model parameters according to the aggregated coding-velocity samples for the one or more prior developer entities and the aggregated coding-velocity samples for the target developer entity,
generating the coding-velocity model from the aggregated coding-velocity samples of the target developer entity and the coding-velocity posterior distribution, wherein the coding-velocity model assigns a likeliness to values of one or more coding-velocity attributes for the target developer entity; and
computing a value of a particular coding-velocity attribute for the target developer entity using the coding-velocity model.

24. The system of claim 23, wherein computing the value of the particular coding-velocity attribute for the target developer entity using the coding-velocity model comprises computing: (i) a representative coding velocity for the target developer entity, (ii) a coding-velocity range for the target developer entity, (iii) estimated working hours supplied by the target developer entity for a particular time period, or (iv) standard coding hours provided by the target developer entity.

25. The system of claim 23, wherein generating the coding-velocity model for the target developer entity comprises selecting a single representative set of model parameters from the coding-velocity posterior distribution.

26. A computer program product, encoded on one or more non-transitory computer storage media, comprising instructions that when executed by one or more computers cause the one or more computers to perform operations comprising:
receiving a definition of a target developer entity, the definition specifying (i) one or more individual source code developers in a population of source code developers and (ii) one or more code bases to which one or more of the one or more individual source code developers have committed source code;

obtaining data representing source code contributions attributed to individual source code developers belonging to the target developer entity, the source code contributions occurring in respective commits by the individual source code developer to the one or more code bases;

obtaining data representing source code contributions attributed to individual source code developers belonging to the population of source code developers;

generating respective coding-velocity samples for each individual source code developer belonging to the target developer entity and for each individual source code developer belonging to the population of source code developers, including computing, for each commit of one or more commits by the individual source code developer to the one or more code bases:
  (i) a measure of coding activity for one or more source code contributions in the commit, and
  (ii) a time duration between (a) the commit to the one or more code bases by the individual source code developer and (b) a previous commit to any code base by the individual source code developer;

aggregating the coding-velocity samples generated for individual source code developers belonging to the target developer entity according to the definition of the target developer entity including determining which coding-velocity samples generated for each individual source code developer were generated from commits to the one or more code bases specified by the definition of the target developer entity;

aggregating the coding-velocity samples generated for individual source code developers belonging to the population of source code developers according to a same principle of aggregation as the definition of the target developer entity to generate one or more prior developer entities;

generating a coding-velocity model for the target developer entity from the aggregated coding-velocity samples of the target developer entity and the aggregated coding-velocity samples of the one or more prior developer entities, including:
  generating, from the aggregated coding-velocity samples for the one or more prior developer entities, a prior distribution that assigns a likeliness to each combination of model parameters for a particular model type,
  generating a coding-velocity posterior distribution for the target developer entity, wherein the coding-velocity posterior distribution assigns a likeliness for each combination of model parameters according to the aggregated coding-velocity samples for the one or more prior developer entities and the aggregated coding-velocity samples for the target developer entity,
  generating the coding-velocity model from the aggregated coding-velocity samples of the target developer entity and the coding-velocity posterior distribution, wherein the coding-velocity model assigns a likeliness to values of one or more coding-velocity attributes for the target developer entity; and computing a value of a particular coding-velocity attribute for the target developer entity using the coding-velocity model.

27. The computer program product of claim 26, wherein computing the value of the particular coding-velocity attribute for the target developer entity using the coding-velocity model comprises computing: (i) a representative coding velocity for the target developer entity, (ii) a coding-velocity range for the target developer entity, (iii) estimated working hours supplied by the target developer entity for a particular time period, or (iv) standard coding hours provided by the target developer entity.

28. The computer program product of claim 26, wherein generating the coding-velocity model for the target developer entity comprises selecting a single representative set of model parameters from the coding-velocity posterior distribution.

29. The computer program product of claim 26, wherein the operations further comprise generating a user interface presentation having a scatter plot that plots total estimated working hours versus standard coding hours, wherein the standard coding hours is based on a coding-velocity point estimate and estimated working hours for each developer entity.

30. The computer program product of claim 26, wherein the operations further comprise generating a user interface presentation that presents a respective score for each of one or more developer entities or a ranking of a plurality of developer entities.

31. The computer program product of claim 26, wherein the operations further comprise:
  computing respective representative coding velocities for the target developer entity for each of multiple time periods; and
  generating a user interface presentation that plots a change of representative coding velocity over time for the target developer entity.

32. The computer program product of claim 31, wherein the operations further comprise generating, within the user interface presentation, an illustration of a number of individual source code developers within the target developer entity over time.

33. The system of claim 23, wherein the operations further comprise generating a user interface presentation having a scatter plot that plots total estimated working hours versus standard coding hours, wherein the standard coding hours is based on a coding-velocity point estimate and estimated working hours for each developer entity.

34. The system of claim 23, wherein the operations further comprise generating a user interface presentation that presents a respective score for each of one or more developer entities or a ranking of a plurality of developer entities.

35. The system of claim 23, wherein the operations further comprise:
  computing respective representative coding velocities for the target developer entity for each of multiple time periods; and
  generating a user interface presentation that plots a change of representative coding velocity over time for the target developer entity.

36. The system of claim 35, wherein the operations further comprise generating, within the user interface presentation, an illustration of a number of individual source code developers within the target developer entity over time.

* * * * *